US011823302B2

(12) United States Patent
Hoogeboom et al.

(10) Patent No.: US 11,823,302 B2
(45) Date of Patent: Nov. 21, 2023

(54) DEVICE FOR AND COMPUTER IMPLEMENTED METHOD OF DIGITAL SIGNAL PROCESSING

(71) Applicant: Robert Bosch GmbH, Stuttgart (DE)

(72) Inventors: Emiel Hoogeboom, Amsterdam (NL); Jakub Tomczak, Diemen (NL); Max Welling, Amsterdam (NL); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 398 days.

(21) Appl. No.: 17/242,710

(22) Filed: Apr. 28, 2021

(65) Prior Publication Data

US 2021/0366160 A1 Nov. 25, 2021

(30) Foreign Application Priority Data

May 22, 2020 (EP) .................................... 20175979

(51) Int. Cl.
  *G06T 9/00* (2006.01)
  *G06N 3/08* (2023.01)
  *G06T 3/40* (2006.01)
(52) U.S. Cl.
  CPC .............. *G06T 9/002* (2013.01); *G06N 3/08* (2013.01); *G06T 3/4046* (2013.01)
(58) Field of Classification Search
  CPC ......... G06T 9/002; G06T 3/4046; G06N 3/08; G06N 3/045; G06N 3/047; G06N 3/084; G06F 17/16
  See application file for complete search history.

(56) References Cited

U.S. PATENT DOCUMENTS

| | | | | |
|---|---|---|---|---|
| 10,176,424 B2* | 1/2019 | Danihelka | ............... | G06N 3/044 |
| 10,796,686 B2* | 10/2020 | Arik | ........................ | G10L 13/08 |
| 11,521,592 B2* | 12/2022 | Ping | ........................ | G10L 13/02 |
| 11,544,191 B2* | 1/2023 | Vengallur | ................ | G06N 3/08 |
| 2020/0134804 A1* | 4/2020 | Song | ..................... | G06V 10/764 |
| 2021/0125313 A1* | 4/2021 | Bai | ........................ | G06T 5/004 |

OTHER PUBLICATIONS

Han G, Su J, Zhang C. A method based on multi-convolution layers joint and generative adversarial networks for vehicle detection. KSII Transactions on Internet and Information Systems (TIIS). 2019;13(4):1795-811. (Year: 2019).*

(Continued)

*Primary Examiner* — Fayyaz Alam
(74) *Attorney, Agent, or Firm* — NORTON ROSE FULBRIGHT US LLP; Gerard Messina

(57) ABSTRACT

A device for and a computer implemented method of digital signal processing. The method includes providing a first set of data, mapping the first set of data with to a second set of data, and determining an output of the digital signal processing depending on the second set of data. The second set of data is determined depending on a sum of a finite series of terms. At least one term of the series is determined depending on a result of a convolution of the first set of data with a kernel and at least one term of the series is determined depending on the first set of data and independent of the kernel.

17 Claims, 4 Drawing Sheets

(56) References Cited

OTHER PUBLICATIONS

Bacciu D, Micheli A, Sperduti A. Generative kernels for tree-structured data. IEEE transactions on neural networks and learning systems. Jan. 15, 2018;29(10):4932-46. (Year: 2018).*

Hoogeboom et al., "The Convolution Exponential," Second Workshop on Invertible Neural Networks, Normalizing Flows, and Explicit Likelihood Models (ICML 2020), Virtual Conference, 2020, pp. 1-9.

Hoogeboom et al., "The Convolution Exponential and Generalized Sylvester Flows," Cornell University, 2020, pp. 1-15.

Zheng et al., "Convolutional Normalizing Flows," ICML 2018 Workshop on Theoretical Foundations and Applications of Deep Generative Models, Cornell University, 2018, pp. 1-9.

Karami et al., "Invertible Convolutional Flow," 33rd Conference on Neural Information Processing Systems (NeurIPS), 2019, pp. 1-11.

Kingma et al., "Auto-Encoding Variational Bayes," Cornell University, in Proceedings of the 2nd International Conference on Learning Representations, 2014, pp. 1-14. <https://arxiv.org/pdf/1312.6114.pdf> Downloaded Apr. 26, 2021.

Rezende et al., "Variational Inference With Normalizing Flows," in Proceedings of the 32nd International Conference on Machine Learning, vol. 37, 2015, pp. 1-9. Downloaded Apr. 26, 2021.

Tomczak et al., "Improving Variational Auto-Encoders Using Householder Flow," Cornell University, 2017, pp. 1-8. <https://arxiv.org/pdf/1611.09630.pdf> Downloaded Apr. 26, 2021.

\* cited by examiner

DEVICE FOR AND COMPUTER IMPLEMENTED METHOD OF DIGITAL SIGNAL PROCESSING

CROSS REFERENCE

The present application claims the benefit under 35 U.S.C. § 119 of European Patent Application No. EP 20175979.2 filed on May 22, 2020, which is expressly incorporated herein by reference in its entirety.

FIELD

The present invention relates to a device for and computer implemented method of digital signal processing in particular for image processing.

Generative models aim to learn a distribution over a high-dimensional variable. Likelihood based generative models are optimized using a log-likelihood objective, and can be broadly divided into Autoregressive Models (ARMs), Variational Autoencoders (VAEs) and Normalizing Flows (NFs).

Aspect of VAEs are for example described in Diederik P. Kingma, Max Welling "Auto-Encoding Variational Bayes". In Proceedings of the 2nd International Conference on Learning Representations, 2014.

Aspects of NFs are for example described in Danilo Rezende and Shakir Mohamed, "Variational Inference with Normalizing Flows." In Proceedings of the 32nd International Conference on Machine Learning, volume 37 of Proceedings of Machine Learning Research, pages 1530-1538. PMLR, 2015

Both NFs and ARMs allow exact likelihood computation. Depending on models, some forms of ARMs do not allow easy inverse computation, at least comparing to NFs, explicit inverse sometimes is not the design concern. NFs use invertible functions whose inverse and Jacobian determinants are easy to compute.

A particular class of normalizing flows are linear normalizing flows. Although linear flows exist, only a few can be applied to convolutions directly.

Mandi Karami ET AL: "Invertible Convolutional Flow", 14 Dec. 2019, XP055749260, and GUOQING ZHENG ET AL: "Convolutional Normalizing Flows", XP081327603, describe aspects of convolutional flows.

SUMMARY

In view of this, a further improvement may be achieved by a method and device according to example embodiment of the present invention, with a transformation, referred to as convolution exponential below. This operation utilizes a matrix exponential to construct a linear transformation that is parametrized by a convolution kernel. The convolution exponential inherits properties from the matrix exponential: forward and inverse computation have the same time complexity and exact determinant computation in linear time.

In one aspect of the present invention, a matrix that is equivalent to the convolution is used in a matrix-vector multiplication with an input vector. This equivalent mathematical form to convolution makes it easy to determine the derivation of the convolution exponential.

According to one aspect of the present invention, the transformation is used in a model for density modeling. According to this aspect, the model is defined by a function that forms a forward part of an invertible artificial neural network, and the inverse of this function forms a reverse part of the invertible artificial neural network.

According to a further aspect of the present invention, in an encoding network, the model is used for mapping a sample onto a representation. In this case, the inverse of the model is automatically a decoder.

In accordance with an example embodiment of the present invention, a computer implemented method of digital signal processing comprises providing a first set of data, mapping the first set of data to a second set of data, and determining an output of the digital signal processing depending on the second set of data, wherein the second set of data is determined depending on a sum of a finite series of terms, wherein at least one term of the series is determined depending on a result of a convolution of the first set of data with a kernel and at least one term of the series is determined depending on the first set of data and independent of the kernel. Due to this method, the same kernel that provides a transformation of a digital signal to its representation can be used to determine a digital signal from a representation thereof and vice versa.

In one aspect of the present invention, at least one term of the series that is determined depending on the kernel is determined depending on a convolution of the kernel with an output of an autoregressive function defined by the first set of data.

The first set of data represents an input at a hidden layer of an artificial neural network, wherein the second set of data represents an output of the hidden layer of the artificial neural network, wherein the input and the output have the same dimension. This means that the convolutional exponential is applied at this layer for invertibility.

Preferably, training input data representing a digital signal is mapped to training output data, wherein the training output data is determined depending on a sum of a series of terms, wherein at least one term of the series is determined depending on a result of a convolution of the training input data with the kernel and at least one term of the series is determined depending on the training input data and independent of the kernel, wherein at least one parameter of an artificial neural network is determined depending on the training output data. The same kernel is used in forward computation and in backward computation. This way, the mapping from inputs to outputs is bijective, i.e., its inverse exists, both forward and inverse mapping are efficiently computable, and both mappings have a tractable Jacobian, which allows explicit density evaluation.

In accordance with an example embodiment of the present invention, the method may comprise a multiplication of elements of the kernel by a negative value, in particular −1. This allows a straightforward backward computation with the same kernel as was used in the forward computation.

In training, the sum of the series of terms may be determined at a hidden layer of an artificial neural network between an input layer of the artificial neural network for the training input data and an output layer of the artificial neural network for the training output data.

An encoder may be defined depending on the kernel, wherein a decoder is defined depending on the kernel, wherein a training of the encoder and/or the decoder comprises mapping a digital signal with the encoder to a representation thereof, and mapping this representation with the decoder to a synthetic signal.

Preferably, at least one term of the series is determined depending on a first result and of a second result, wherein the first result is determined depending on a first convolution of the first set of data with the kernel and wherein the second result is determined depending on a second convolution of the first result with the kernel. The first result may be re-used for calculating the second result without re-calculating the first result in the series. Therefore, the sum is determined efficiently.

In one aspect of the present invention, the at least one term of the series, that is determined depending on a number of convolutions, is determined depending on a result of a division by a factorial, wherein the factorial is defined by the product of positive integers less than or equal to the number. This way higher order terms will contribute less to the sum. Therefore, the sum may comprise a finite number of terms.

In accordance with an example embodiment of the present invention, the method may comprise determining the first set of data depending on a digital signal, wherein representation of the digital signal is determined depending on the second set of data, or by determining the first set of data depending on a representation of a digital signal, wherein a synthetic sample of the digital signal is determined depending on the second set of data.

In accordance with an example embodiment of the present invention, the method may comprise determining a density depending on the second set of data, wherein the output of the digital signal processing indicates whether the density meets a condition or not.

In another aspect of the present invention, a plurality of sums of terms is determined depending on a plurality of kernels. The mapping between images and representations thereof or vice versa may have many layers in between the input layer and the output layer of the invertible artificial neural network. Each of these layers or some of these layers may be designed for the convolution.

Advantageously, the plurality of sums of terms is determined depending on kernels that differ from each other. For different tasks different convolutions may be defined.

Preferably, the first set of data is sampled from a random distribution having a density or the first set of data is determined depending on an autoregressive function from input data. This allows to sample digital signals or digital images by sampling from the distribution or input data and using the transformation.

Preferably, the kernel defines a square matrix for a matrix multiplication with an input that is equivalent to the convolution of the input with the kernel, wherein a spectral norm of the matrix is less than 1.

A device for digital signal processing is configured to execute the method, in accordance with an example embodiment of the present invention.

Further advantageous embodiments are derivable from the following description and the figures.

DETAILED DESCRIPTION OF EXAMPLE EMBODIMENTS

Figure 1:
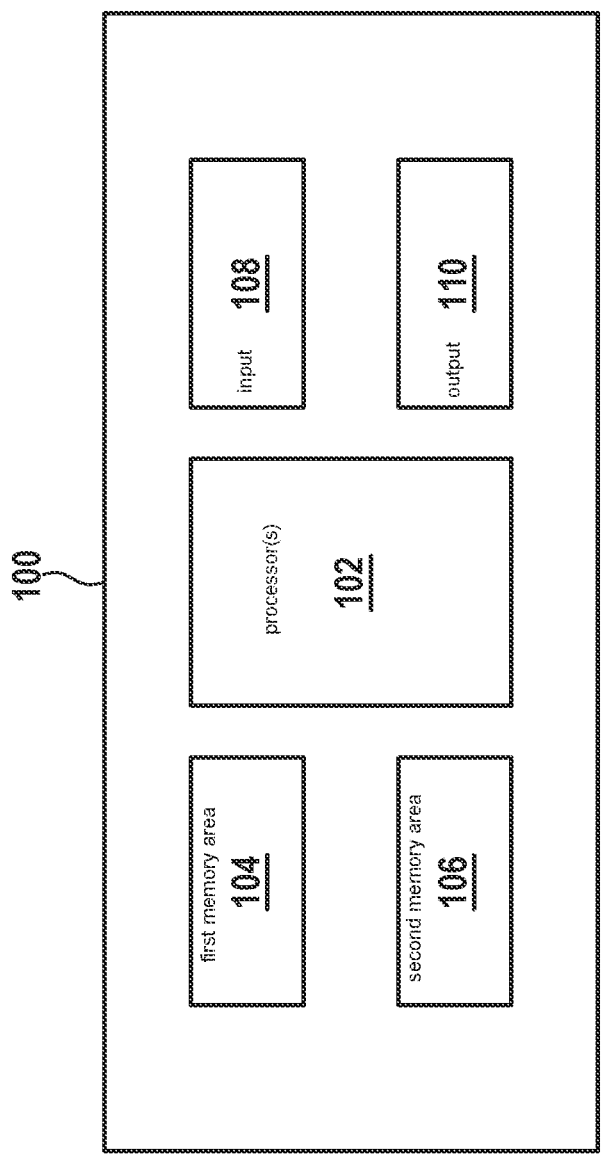
FIG. 1 schematically depicts a device for digital signal processing, in accordance with an example embodiment of the present invention.

FIG. 1 schematically depicts a device 100. The device 100 comprises at least one processor 102, a first memory area 104 and a second memory area 106. The device 100 may comprise storage for instructions that, when executed by the device 100 cause the device 100 to execute steps of any method described below. The at least one processor 102 may comprise a digital signal processor hardware with electric circuitry for determining at least on arithmetic operation for content of the first memory area 104 or the second memory area 106 in the method. The at least one processor 102 may comprise a hardware accelerator for at least one arithmetic operation and a controller for instructing the hardware accelerator to perform at least a part of a step or of steps of any of the methods.

The device 100 may comprise an input 108 for an input signal. The input signal may be data of a digital image or any other digital signal. The device 100 may comprise an output 110 for an output signal. The output signal may be data representing the image or information about the image or the other digital signal.

Aspects of the methods of and device 100 for signal processing will be described below for a convolutional kernel. Instead of a convolutional kernel a kernel for cross-correlation may be used to analyze a digital signal.

The present invention will described below for digital image processing. The present invention is not limited to digital image processing but applies as well to processing other digital signals.

The input signal may be a sensor signal from, e.g., a camera, a radar sensor, a LiDAR sensor, an ultrasonic sensor, a wheel speed sensor, a yaw rate sensor, an acceleration sensor. The input signal and/or the output signal may be a signal for a computer-controlled machine, like a robot, a vehicle, a domestic appliance, a power tool, a manufacturing machine, a personal assistant or an access control system. The input signal and/or the output signal may be a signal for a system for conveying information, like a surveillance system, a medical system or a medical imaging system.

The device 100 may be configured for determining a representation z of a digital image depending on a sample x representing the digital image. The device 100 may be configured for determining a synthetic sample x representing the digital image from the representation z.

Let $X \sim p_X$, $Z \sim p_Z$ be some random variable with $Z = f(X)$.

$$p_X(x) = p_Z(f(x)) |\det D_x f|$$

where $|\det D_x f|$ is the absolute determinant of the Jacobian and $f$ represents an invertible function.

The representation z may be defined by a random distribution having a density $p_Z$. Then representations z of the digital images can be sampled from this random distribution and transformed to the sample x representing the digital image by the function $f$.

$$X = f^{-1}(Z) \sim p_X$$

Figure 2:
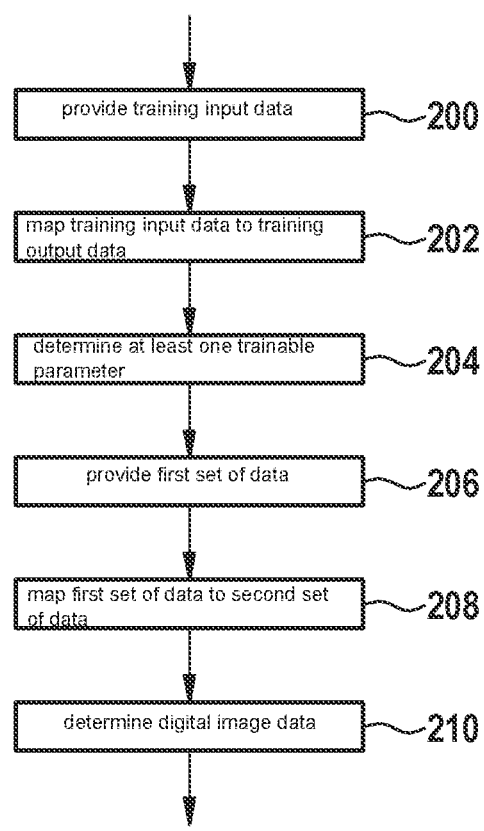
FIG. 2 steps in a method of digital signal processing, in accordance with an example embodiment of the present invention.

FIG. 2 depicts steps of a computer implemented method for digital image processing. Computer implemented in this context may refer to the processing of the steps by at least one processor, e.g., the device 100.

The method for digital image processing will be described below for a model implementing an invertible function $f$ and a linear convolutional exponential.

The model for the invertible function $f$ may be implemented comprising a kernel m. The kernel m may be used for example to determine the representation z of the sample x as the result of the following convolution:

$$z = m * x$$

The model may be implemented as an invertible artificial neural network. Invertible in this context means that the artificial neural network has a forward computation, e.g., a mapping $$f: \mathbb{R}_d \to \mathbb{R}_d$$

$$x \mapsto z$$

and a backward computation, e.g., an inverse mapping $$f^{-1}: \mathbb{R}_d \to \mathbb{R}_d$$

$$z \mapsto x$$

The artificial neural network may comprise a plurality of such mappings. A mapping and a corresponding inverse mapping may be implemented as a layer of the artificial neural network.

The kernel m may be transformed to an equivalent matrix M and the result of the convolution $z=m*x$ may be determined as a multiplication of the equivalent matrix M with x $$z = Mx$$

Depending on the equivalent matrix M a matrix exponential exp(M) may be defined as $$\exp(M) \equiv J + \frac{M}{1!} + \frac{M^2}{2!} + \cdots = \sum_{i=0}^{\infty} \frac{M^i}{i!}$$

where $M$ is a matrix and $$\exp(M)\exp(-M) = I$$

where the determinant of the matrix exponential $$|\exp(M)| = e^{Tr\, M}$$

is defined as the trace Tr, i.e., the sum of all elements on the main diagonal of the equivalent matrix M. The layer of the artificial neural network implementing M has an input and output that have the same dimension.

Thus, a log Jacobian determinant may be computed easily for an artificial neural network layer representing this mapping once the inverse and the determinant of the equivalent matrix M are computed.

The sum to determine the matrix exponential exp(M) is a matrix iteration wherein every subsequent potentiation of M takes a smaller value than the previous one when the matrix M is selected to have its spectral norm smaller than one.

If the spectral norm is smaller than one then the matrix iteration converges to the zero matrix:

$$\lim_{k \to \infty} \|M\|^k = 0$$

When the largest eigenvalue of the equivalent matrix M is less than one, the higher order terms of the exp(M) can be ignored in the matrix iteration.

For finite k the equivalent matrix M models a contraction, because every subsequent potentiation of M takes a smaller step:

$$\|M^{k+1}x - M^k x\| < \|M^k x - M^{k-1} x\|$$

This solves the computation problem because exp(M) can be computed in a tractable way by ignoring the higher order terms.

Thus it is possible, to efficiently compute this matrix inverse while retaining the expressive capacity of the invertible artificial neural network.

This property may be used to perform bijective mapping for the kernel m, i.e., from input to output and vice versa as described below. This may be used for mapping the sample x to the representation z, or create the synthetic sample x given the representation z.

The convolution exponential may be defined for an arbitrary vector x as $$m *_e x = x + \frac{m * x}{1!} + \frac{m * (m * x)}{2!} + \cdots$$

The convolutional exponential $m *_e x$ is a transformation that is defined depending on the kernel m as an infinite series of terms. In this sum of terms the kernel m can be determined having an equivalent matrix M as described above so that every subsequent term takes smaller values.

$$M *_e x \equiv \exp(M) x$$

A finite series of the terms may then be used for tractable computation as described below wherein higher order terms are ignored.

For discrete signals that are infinitely defined m*(m*x) is equivalent (m*m)*x. Potential edge artifacts that may be introduced by convolution layers that operate on finite representations are avoided by computing in the order of m*(m*x).

The inverse of this transformation is straightforwardly the infinite sum of terms $$-m *_e z = x + \frac{-m * z}{1!} + \frac{-m * (-m * z)}{2!} + \cdots$$

In this sum of terms the kernel m is determined having the equivalent matrix M as described above so that every subsequent term takes smaller values. A finite series of terms may then be used for tractable computation as described below wherein higher order terms are ignored.

This means that the inverse mapping $f^{-1}$ is determined depending on the same kernel m for $f$. The kernel m is in the example multiplied by a negative value. More specifically, elements of the kernel m may be multiplied by the negative value. The negative value in the example is −1.

The same kernel m therefore can be used in training, testing and/or during inference for density modelling with an invertible artificial neural network. The kernel m can be used for density modelling independently after training. The kernel m can be used as encoder and the same kernel m can be used as decoder in training, testing and/or during inference with an artificial neural network.

For a generalized Sylvester Flow, i.e., a transformation $$z = x + W^{-1} f_{AR}(Wx + b)$$

with an invertible matrix W, a trainable parameter b and an autoregressive function $f_{AR}$ a determinant is defined as $$\left|\frac{dz}{dx}\right| = |I + J_{f_{AR}}(Wx+b)|$$

where $J_{f_{AR}}(Wx+b)$ denotes the Jacobian of $f_{AR}$.

In the example, the function $f_{AR}$ is autoregressive, i.e.

$$\frac{\partial f_{AR}(x)_i}{\partial x_j} = 0, \text{ if } j > i$$

and constraint by $$\frac{\partial f_{AR}(x)_i}{\partial x_i} > -1$$

A possible alternative without additional constraints on $f_{AR}$ is to utilize bisection methods to solve the univariate monotonic increasing equation, given the solutions for previous dimensions.

Using the convolutional exponential exp(M), this determinant is made computable by defining:

$$W = \exp(M)Q$$

where Q is in the example an orthogonal 1×1 convolution modeled by Householder reflections and a convolutional Sylvester Flow is determined as $$z = x + Q^T((-m)*_e f_{AR}(m*_e Qx+b))$$

For this transformation, the determinant is $$\left|\frac{dz}{dx}\right| = |I + J_{f_{AR}}(m*_e Qx + b)|$$

Householder reflections are described for example in Tomczak, J. M. and Welling, M. (2016), "Improving variational auto-encoders using householder flow." arXiv preprint arXiv:1611.09630.

This means that the mapping $f$ is determined depending on the kernel m. More specifically, the representation z is determined from the sample x depending on a sum of a finite series of terms, wherein a first term is the sample x. A second term $Q^T((-m)*_e f_{AR}(m*_e Qx+b))$ of the series is determined depending on a result of a first convolutional exponential $-m*_e f_{AR}$ that depends on the kernel m and the autoregressive function $f_{AR}$. The autoregressive function $f_{AR}$ is determined depending on a second convolutional exponential that depends on the kernel m and the sample X.

The first convolutional exponential $-m*_e f_{AR}$ is determined in the example as a sum of a finite series of terms $$-m*_e f_{AR} = f_{AR} + \frac{-m*f_{AR}}{1!} + \frac{-m*(-m*f_{AR})}{2!} + \cdots$$

This means, that at least one term of the series is determined depending on a convolution of the function $f_{AR}$ with the kernel m and one term $f_{AR}$ of the sum is determined independent of the kernel m.

A second convolutional exponential $m*_e Qx+b$ is determined in the example as a sum of a finite series of terms $$-m*_e Qx+b = Qx+b + \frac{m*(Qx+b)}{1!} + \frac{m*(m*Qx+b)}{2!} + \cdots$$

This means, that at least one term of the series is determined depending on a convolution of Qx+b with the kernel m and one term Qx+b of the sum is determined independent of the kernel m.

The same kernel m can be used in training, testing and/or during inference for density modelling with an invertible artificial neural network according to the generalized Sylvester Flow. The artificial neural network according to the generalized Sylvester Flow can be used for density modelling independently after training. The first kernel m can be used as encoder and the same kernel m can be used as decoder in training, testing and/or during inference with an artificial neural network.

Considering that the sample x or the synthetic sample x and the representation z are variables, and that the invertible function $f$ maps each x to a unique $z=f(x)$, the density $p_X(x)$ can be expressed in terms of the random distribution having the density $p_Z(x)$ and the absolute value of the Jacobian determinant of $$p_X(x) = p_Z(f(x))|\det D_X f|$$

The random distribution having the density $p_Z(x)$ may be a factorized distribution, e.g., a diagonal Gaussian distribution. The invertible function $f$ is a function comprising learnable parameters. The learnable parameters may define the kernel m. The model that implements the invertible function $f$ is defined by the learnable parameters.

The computer implemented method for digital image processing comprises a step 200 wherein training input data x representing a digital image is provided.

Afterwards, in a step 202, the training input data x is mapped by the model implementing the function $f$ to training output data $z=f(x)$. In the example, the artificial neural network implements the function $f$.

Afterwards, in a step 204, at least one trainable parameter for the mapping from z to x is determined. The at least one trainable parameter may be a parameter of a layer of the artificial neural network.

To determine the at least one trainable parameter the training output data z is evaluated. The training output data z may be evaluated depending on a given density $p_Z$. The training output data z may be evaluated depending on the Jacobian determinant $\det D_X f$.

The training input data and the training output data may be provided for a plurality of training points. In the example, the density $p_X(x)$ of the training input data x for the plurality of training points is determined as $$p_X(x) = p_Z(z)|\det D_X f|$$

The objective in the training is to optimize the function $f$, such that a sum of density $p_X(x)$ over the training points is maximized.

In the example, the density $p_Z$ may be a prior distribution that is pre-specified. The density $p_Z$ may be a distribution with a few trainable parameters like mean or variance. The latter is preferable if $p_Z$ is a general Gaussian distribution rather than a standard Gaussian distribution.

In one aspect, a value for at least one of the trainable parameters is determined that results in a higher density $p_X(x)$ than the density $p_X(x)$ achieved by other values for the at least one trainable parameter.

When the model is implemented as invertible artificial neural network, the invertible artificial neural network may comprise a plurality of layers $h_l$. In this case, parameters of at least one layer of the plurality of layers $h_l$ of the invertible artificial neural network may be determined in training.

The trainable parameters may be determined depending on a log density $$\log p_X(x) = \log p_Z(z) + \sum_{i=1}^{L} \log \left| \frac{\partial h_i(z_{i-1})}{\partial z_{i-1}} \right|$$

wherein the representation z is an output of the chain of layers, wherein $z_{l-1}$ is the input to a layer $h_l$ and the output of a layer $h_{l-1}$, wherein $z_{l-1}=h_{l-1} \circ h_{l-2} \circ \ldots h_1(z)$ and wherein $h_l: \mathbb{R}^r \to \mathbb{R}^s$ is defined by components $h_1, \ldots, h_r$ and the input $z_{l-1}$ is a point in $\mathbb{R}^r$ defined by $z_1, \ldots, z_s$.

In this aspect, a value for at least one of the trainable parameters is determined that results in a higher log density $p_X(x)$ than the log density $p_X(x)$ achieved by other values for the at least one trainable parameter. In this case, the trainable parameters are parameters of a layer $h_l$. The training of multiple layers may comprise backward propagation from z to x.

Preferably, at least one parameter is determined that maximizes the density or the log density.

After the training, a step 206 is executed.

In step 206 a first set of data z is provided. In the example, the first set of data z is sampled from the random distribution having the density $p_Z$.

At test time for image synthesis, in step 206 the first set of data z is drawn from the random distribution having the density $p_Z$.

Afterwards, in a step 208, the first set of data z is mapped depending on the model to a second set of data x representing digital image data.

This is a result of a backward calculation of the artificial neural network, i.e., $f^{-1}$1 to determine the second set of data x.

Afterwards, in a step 210, digital image data is determined depending on the second set of data x.

An output of the digital signal processing is defined in this example by the digital image data. For other digital signals, the output may be defined accordingly.

The steps 206 to 210 may be executed after the training independently from the steps 200 to 204.

In one aspect, the function $f$ is represented by the model. The model is defined in one aspect depending on a part of the convolutional exponential, i.e., depending on a sum of a finite series of terms of the convolutional exponential.

One term of the series is defined depending on the first set of data z and independent of the kernel.

At least one term of the series is defined depending on a result of a convolution of the first set of data z with the kernel, e.g.

$$\frac{-m*z}{1!}.$$

The result of this convolution m*z may be used to determine a result or another term, e.g., $$\frac{-m*(-m*z)}{2!}.$$

In the example the terms of the series are ordered with an integer index i starting from 1. The index defines a number of subsequent convolutions that are determined for the term. This number defines a factorial for the term and the term is determined depending on a result of a division by this factorial. The factorial is defined by the product of positive integers less than or equal to the number.

In another aspect, the model represents the transformation for the generalized Sylvester Flow as described above.

Figure 3:
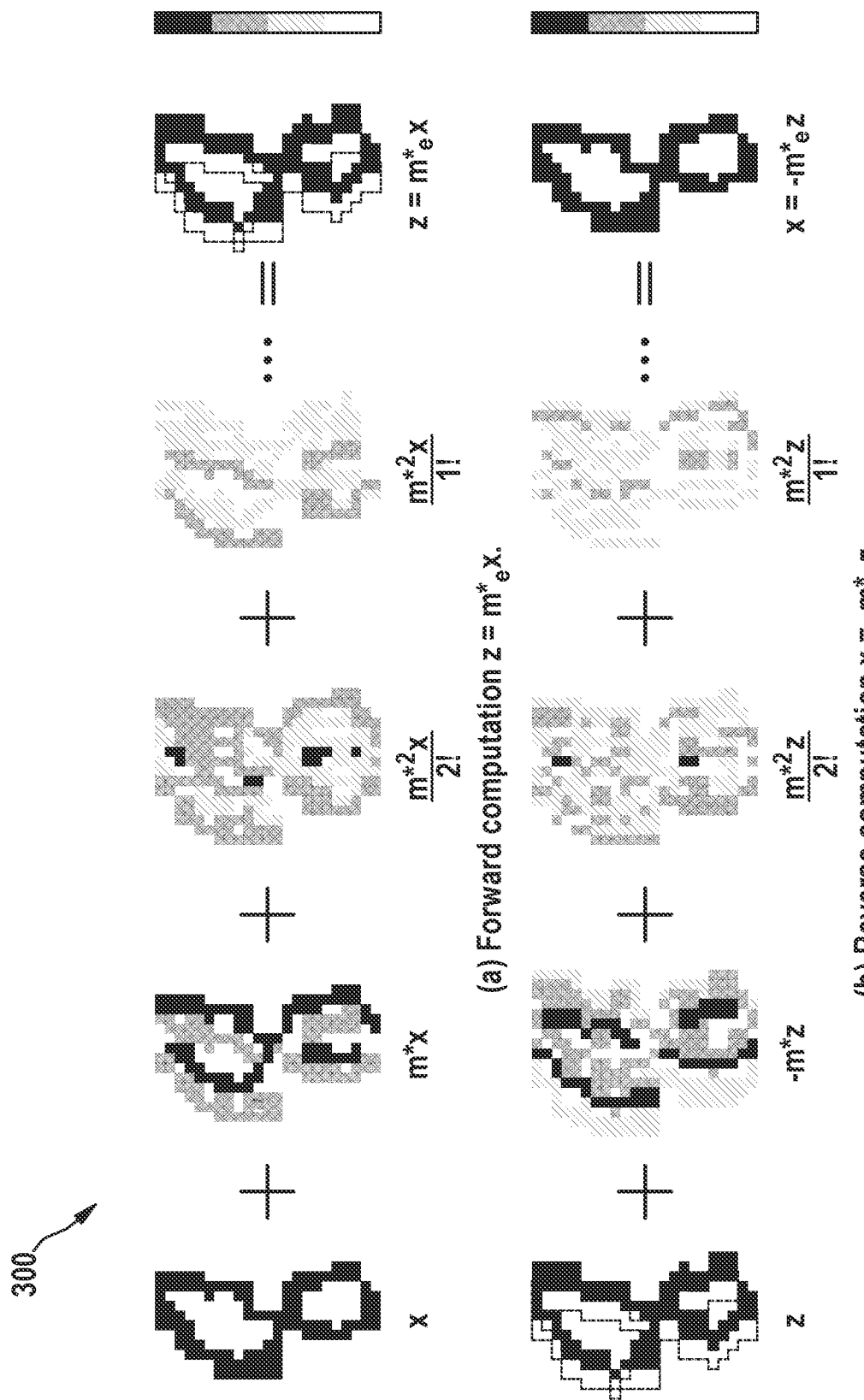
FIG. 3 shows a visualization of feature maps in a convolution, in accordance with an example embodiment of the present invention.

FIG. 3 depicts a visualization 300 of feature maps in a convolution.

The top part of the visualization 300 visualizes feature maps according to a forward computation based on a sequence for $m*_e x$. Depicted are from left to right elements of the sum $$x + \frac{m*x}{1!} + \frac{m*(m*x)}{2!} + \cdots$$

starting with element x on the left. A feature map for the result $m*_e x$ is depicted on the right.

The kernel m in this example has been applied to digital image data of a two dimensional input image. The kernel m that creates the depicted feature maps is the kernel m=[0.6; 0; −0.6]. The notation $m*^2$ x refers to m*(m*x), that is two subsequent convolutions on x. Similarly for any n the expression $m*^n$ x=m*($m*^{n-1}$ x)= . . . refers to n subsequent convolutions.

The bottom part of the visualization 300 visualizes feature maps according to a backward computation based on a sequence for $-m*_e z$. Depicted are from left to right elements of the sum $$z + \frac{-m*z}{1!} + \frac{-m*(-m*z)}{2!} + \cdots$$

starting with element z on the left. A feature map for the result $m*_e z$ is depicted on the right.

The function $f$ in the example can be used for density modeling wherein the kernel m defines a forward part of the invertible artificial neural network and the kernel m defines a reverse part of the invertible artificial neural network.

According to a further aspect, in an encoding network, the model may be used for mapping with the kernel m a sample x onto a representation z. In this case, the kernel m defines a corresponding decoder.

The encoder may be defined depending on the invertible function $f$, the decoder is in this case defined depending on the inverse of the function $f^{-1}$. This means that the encoder and the decoder comprise the same kernel m. The training in this aspect may comprise determining the at least one parameter of the invertible function $f$. The training may comprise mapping a digital image or another digital signal with the encoder to a representation thereof, and decoding this representation with the decoder to determine a synthetic image or other synthetic digital signal.

A density learning model depending on the kernel m may be used for anomaly detection. The anomaly detection may be based on the kernel m according to the generalized Sylvester Flow as described above.

Figure 4:
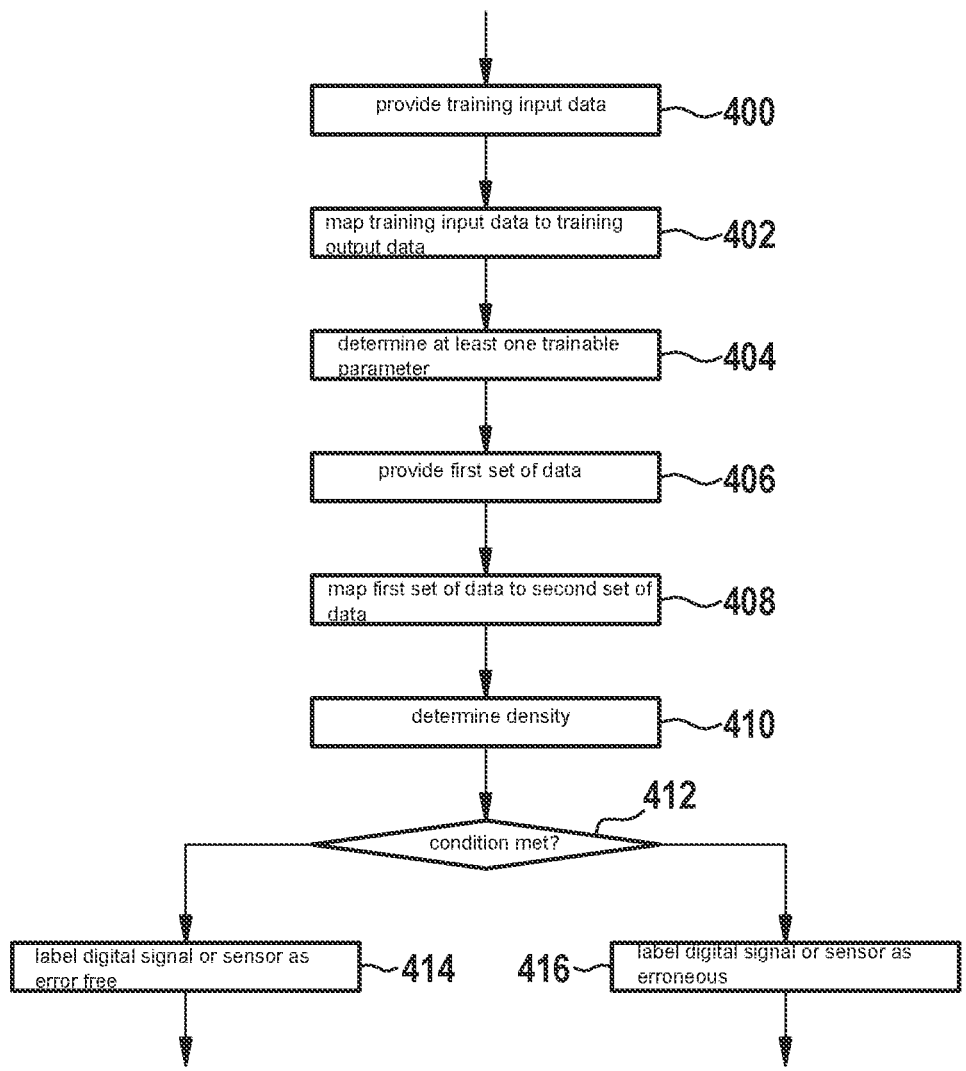
FIG. 4 shows a method for anomaly detection, in accordance with an example embodiment of the present invention.

A method for signal processing for anomaly detection is described below referencing FIG. 4.

The computer implemented method for anomaly detection comprises a step 400 wherein training input data representing a digital signal, e.g., of a sensor is provided. The training input data represents in-distribution data, i.e., data that represents digital signals that are expected in regular or error free operation, e.g., of the sensor.

Afterwards, in a step 402, the training input data is mapped by the model implementing the function $f$ to training output data.

In the example, the density $p_Z$ of the random distribution is determined depending on the training output data.

Afterwards, in a step 404, at least one trainable parameter of the function $f$ is determined.

As described for step 204 above, at least one trainable parameter is determined.

After the training, a step 406 is executed.

In step 406 a first set of data x is provided. In the example, the first set of data x represents a digital signal, e.g., from the sensor.

Afterwards, in a step 408, the first set of data x is mapped depending on the model to a second set of data z representing digital image data.

Afterwards, in a step 410, a density $p_X(x)=p_Z(z)|\det D_x f|$ is determined depending on the second set of data z.

Afterwards, in a step 412, it is determined if the density $p_X(x)$ meets a condition or not. For example, the density $p_X(x)$ is compared to a threshold. When the density $p_X(x)$ exceeds the threshold, a step 414 is executed. Otherwise a step 416 is executed. An output of the digital signal processing is defined in this example by the steps 414 or 416.

In the example, the density $p_X(x)$ is supposed to be equal to or less than the threshold when the digital signal is likely to contain an anomaly. This means, the density $p_X(x)$ exceeds the threshold, when the digital signal is considered to be error free. The threshold may be selectable or tunable depending on the use case.

In step 414, the digital signal or the sensor is for example labelled as error free. In Step 416, the digital signal or the sensor is for example labelled as erroneous.

The steps 406 to 416 may be executed after the training independently from the steps 400 to 404.

This means that based on the density $p_X(x)$, a threshold test is provided to reject unlikely data.

What is claimed is:

1. A computer implemented method for digital signal processing, the method comprising the following steps:
    providing a first set of data;
    mapping the first set of data to a second set of data; and
    determining an output of the digital signal processing depending on the second set of data;
    wherein the second set of data is determined depending on a sum of a finite series of terms, wherein at least one term of the finite series is determined depending on a result of a convolution of the first set of data with a kernel and at least one term of the finite series is determined depending on the first set of data and independent of the kernel, at least one term of the finite series is determined depending on a first result, and wherein the first result is determined depending on a first convolution of the first set of data with the kernel and wherein the at least one term is determined depending on a second convolution of the first result with the kernel.

2. The method according to claim 1, wherein at least one term of the finite series that is determined depending on the kernel is determined depending on a convolution of the kernel with an output of an autoregressive function defined by the first set of data.

3. The method according to claim 1, wherein the first set of data represents an input at a hidden layer of an artificial neural network between an input layer and an output layer, wherein the second set of data represents an output of the artificial neural network, and wherein the input and the output have the same dimension.

4. The method according to claim 1, wherein training input data representing a digital signal is mapped to training output data, wherein the training output data is determined depending on a sum of a series of terms, wherein at least one term of the series of terms is determined depending on a result of a convolution of the training input data with the kernel and at least one term of the series of terms is determined depending on the training input data and independent of the kernel, and wherein at least one parameter of an artificial neural network is determined depending on the training output data.

5. The method according to claim 1, characterized by a multiplication of elements of the kernel by a negative value.

6. The method according to claim 1, wherein the negative value is −1.

7. The method according to claim 4, wherein, in training, the sum of the series of terms is determined at a hidden layer of an artificial neural network arranged between an input layer of the artificial neural network for the training input data and an output layer of the artificial neural network for the training output data.

8. The method according to claim 1, wherein an encoder is defined depending on the kernel, wherein a decoder is defined depending on the kernel, wherein a training of the encoder and/or the decoder includes mapping a digital signal with the encoder to a representation thereof, and mapping the representation with the decoder to a synthetic signal.

9. The method according to claim 1, characterized in that the at least one term of the series, that is determined depending on a number of convolutions, is determined depending on a result of a division by a factorial, wherein the factorial is defined by the product of positive integers less than or equal to the number.

10. The method according to claim 1, further comprising:
    determining the first set of data depending on a digital signal, wherein a representation of the digital signal is determined depending on the second set of data, or by determining the first set of data depending on a representation of a digital signal;
    wherein a synthetic sample of the digital signal is determined depending on the second set of data.

11. The method according to claim 10, further comprising:
    determining a density depending on the second set of data, wherein the output of the digital signal processing indicates whether the density meets a condition or not.

12. The method according to claim 1, further comprising:
    determining a plurality of sums of terms depending on a plurality of kernels.

13. The method according to claim 12, further comprising:
    determining the plurality of sums of terms depending on kernels that differ from each other.

14. The method according to claim 1, wherein the first set of data is sampled from a random distribution having a density or the first set of data is determined depending on an autoregressive function from input data.

15. The method according to claim 1, wherein the kernel defines a square matrix for a matrix multiplication with an input that is equivalent to the convolution of the input with the kernel, wherein a spectral norm of the matrix is less than 1.

16. A device for digital signal processing, the device configured to:
providing a first set of data;
mapping the first set of data to a second set of data; and
determining an output of the digital signal processing depending on the second set of data;
wherein the second set of data is determined depending on a sum of a finite series of terms, wherein at least one term of the finite series is determined depending on a result of a convolution of the first set of data with a kernel and at least one term of the finite series is determined depending on the first set of data and independent of the kernel, at least one term of the finite series is determined depending on a first result, and wherein the first result is determined depending on a first convolution of the first set of data with the kernel and wherein the at least one term is determined depending on a second convolution of the first result with the kernel.

17. A non-transitory computer-readable storage medium on which is stored a computer program for digital signal processing, the computer program, when executed by a computer, cause the computer to perform the following steps:
providing a first set of data;
mapping the first set of data to a second set of data; and
determining an output of the digital signal processing depending on the second set of data;
wherein the second set of data is determined depending on a sum of a finite series of terms, wherein at least one term of the finite series is determined depending on a result of a convolution of the first set of data with a kernel and at least one term of the finite series is determined depending on the first set of data and independent of the kernel, at least one term of the finite series is determined depending on a first result, and wherein the first result is determined depending on a first convolution of the first set of data with the kernel and wherein the at least one term is determined depending on a second convolution of the first result with the kernel.

* * * * *